United States Patent [19]

Seki et al.

[11] Patent Number: 5,160,360
[45] Date of Patent: Nov. 3, 1992

[54] PROCESS FOR PRODUCING LOW-LOSS EMBEDDED WAVEGUIDE

[75] Inventors: Masafumi Seki; Hideki Hashizume; Kenichi Nakama; Shigeru Kobayashi, all of Osaka, Japan

[73] Assignee: Nippon Sheet Glass Co., Ltd., Osaka, Japan

[21] Appl. No.: 609,545

[22] Filed: Nov. 6, 1990

[30] Foreign Application Priority Data

Nov. 6, 1989 [JP] Japan .................. 1-288511

[51] Int. Cl.$^5$ .............................. C03C 21/00
[52] U.S. Cl. ...................... 65/30.13; 65/60.51; 65/117
[58] Field of Search ............ 65/30.13, 33, 60.1, 65/60.4, 60.5, 117

[56] References Cited

U.S. PATENT DOCUMENTS

| | | | |
|---|---|---|---|
| 3,836,348 | 9/1974 | Sumimoto et al. | 65/30.13 |
| 4,765,702 | 8/1988 | Dohan et al. | 350/96.12 |
| 4,913,717 | 4/1990 | Cooper | 65/30.13 |
| 4,933,262 | 6/1990 | Beguin | 350/96.12 |

FOREIGN PATENT DOCUMENTS

| | | |
|---|---|---|
| 3501898 | 7/1986 | Fed. Rep. of Germany . |
| 60-256101 | 12/1985 | Japan . |
| 61-070533 | 4/1986 | Japan . |
| 61-070534 | 4/1986 | Japan . |
| 61-070539 | 4/1986 | Japan . |
| 61-070540 | 4/1986 | Japan . |
| 63-206709 | 8/1988 | Japan . |

OTHER PUBLICATIONS

Albert et al., "Full Modeling of Field Assisted Ion Exchange", Applied Optics, 29(18), pp. 2798-2804.
Blahut et al., "Gradient Index Planar Glass Waveguides", Zesz. Nauk. Politech. Slask., Mat.-Fiz., 60, pp. 31-40.
Seki et al., "Two-Step Purely Thermal Ion-Exchange Technique", Electronic Letters, vol. 24, pp. 1258-1259, 1988.
Alferness, "Waveguide Electrooptic Modulators", IEEE Transactions on Microwave Theory, vol. MTT-30, No. 8, Aug. 1988, pp. 1121-1137.
Yamada et al., "Optical Fibre Coupling to High-Silica Channel Waveguide", Electronic Letters, vol. 20, No. 8, pp. 313-314, 1984.

Primary Examiner—Robert L. Lindsay
Attorney, Agent, or Firm—Sughrue, Mion, Zinn, Macpeak & Seas

[57] ABSTRACT

A process for producing a low-loss embedded waveguide is disclosed, which comprises: a first ion exchange step in which a glass substrate containing a monovalent ion and capable of undergoing ion exchange is subjected to thermal ion exchange through an ion exchange-control film provided on the substrate and having a predetermined waveguide pattern formed therein, by immersing the substrate in a first molten salt containing a first monovalent ion capable of changing the refractive index of the substrate; an etching step in which the ion exchange-control film is removed form the substrate by etching; an electric field-applying annealing step in which an electric field is applied to the substrate at substantially right angles to the substrate at a temperature near the temperature at which the first ion exchange step was conducted, provided that the side of the substrate which had the ion exchange-control film is used as a positive potential side; and a second ion exchange step in which the resulting glass substrate is subjected to thermal ion exchange by immersing the substrate in a second molten salt containing a second monovalent ion capable of changing the refractive index of the substrate in a manner contrary to the first monovalent ion.

13 Claims, 2 Drawing Sheets

PROCESS FOR PRODUCING LOW-LOSS EMBEDDED WAVEGUIDE

FIELD OF THE INVENTION

The present invention relates to a process for producing a low-loss embedded waveguide. More particularly, it relates to a process for producing a single-mode waveguide which shows a low coupling loss when directly coupled to a single-mode optical fiber and also has a low transmission loss.

BACKGROUND OF THE INVENTION

Construction of an optical fiber communications system requires a single-mode waveguide device having various functions. The ion exchange method is one of the processes that can provide such a device at low cost. The present inventors previously newly proposed a two-stage purely-thermal ion exchange method, and demonstrated its usefulness. The process of this method is described in *Electronics Letters*, Vol.24, p.1258 (1988), and preferred preparation conditions are disclosed in JP-A-63-206709. (The term "JP-A" as used herein means an "unexamined published Japanese patent application") By using this method, a single-mode waveguide which shows a coupling loss of 0.25 to 0.35 dB when coupled to a standard single-mode optical fiber with a mode field diameter of about 9 μm and also has a transmission loss of about 0.1 to 0.2 dB/cm can be produced relatively easily.

However, the conventional process described above has been insufficient in that the coupling loss of the waveguide obtained is somewhat high. For this reason, it has been a little difficult to produce devices having extremely low losses with an excess loss of 1 dB or less. Although this problem can be eliminated by the conventionally known electric field-applying ion exchange method, particularly by the two-stage electric field ion exchange method in which an electric field is applied at least during the second-stage ion exchange. However, this troublesome production process must be employed to attain sufficiently low losses, so that low-cost mass production has been impossible.

SUMMARY OF THE INVENTION

An object of the present invention is to provide a novel process for producing a low-loss waveguide by a simple ion exchange process, thereby to overcome the above-described problems of the conventional processes.

Other objects and effects of the present invention will be apparent from the following description.

The present invention provides a process for producing a low-loss embedded waveguide, which comprises:

a first ion exchange step in which a glass substrate containing a monovalent ion and capable of undergoing ion exchange is subjected to thermal ion exchange through an ion exchange-control film provided on the substrate and having a predetermined waveguide pattern formed therein, by immersing the substrate in a first molten salt containing a first monovalent ion capable of changing the refractive index of the substrate;

an etching step in which the ion exchange-control film is removed form the substrate by etching;

an electric field-applying annealing step in which an electric field is applied to the substrate at substantially right angles to the substrate at a temperature near the temperature at which the first ion exchange step was conducted, provided that the side of the substrate which had the ion exchange-control film is used as a positive potential side; and a second ion exchange step in which the resulting glass substrate is subjected to thermal ion exchange by immersing the substrate in a second molten salt containing a second monovalent ion capable of changing the refractive index of the substrate in a manner contrary to the first monovalent ion.

DETAILED DESCRIPTION OF THE INVENTION

Figure 1A:
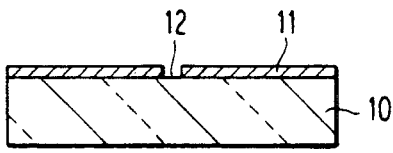
FIG. 1 (*a*) to (*d*) are cross-sectional views illustrating respective steps in one embodiment of the process for producing a low-loss embedded waveguide according to the present invention.
Figure 1B:
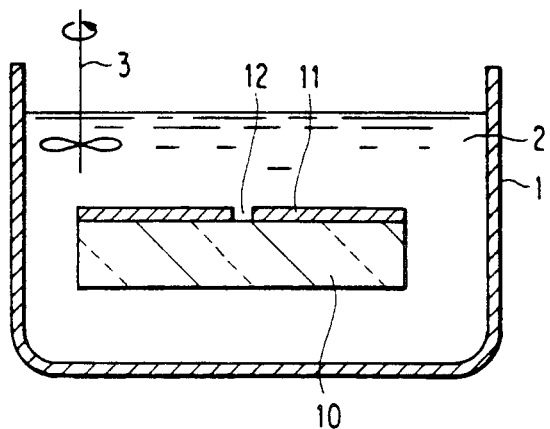
Figure 1C:
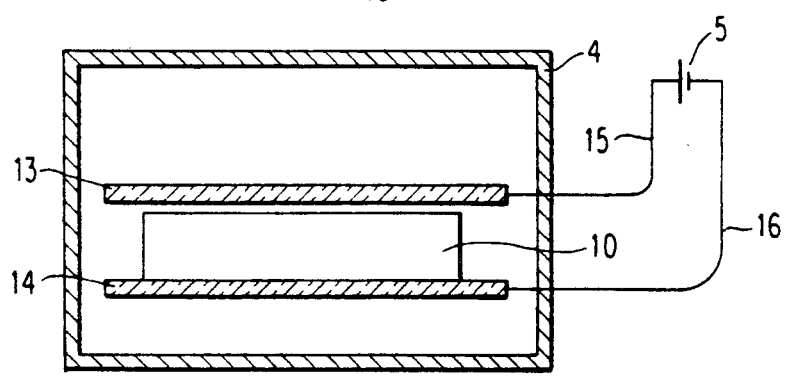
Figure 1D:
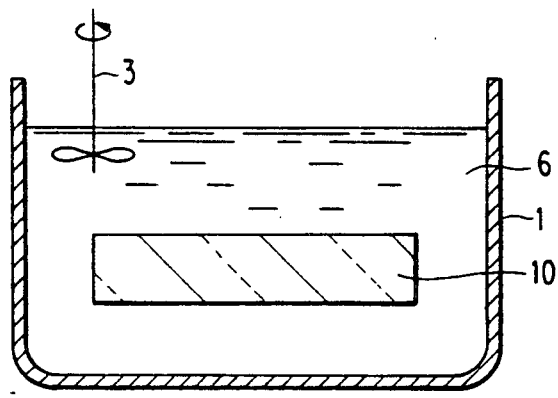

The process for producing a low-loss embedded waveguide according to the present invention is described in more detail below.

In the first ion exchange step, thermal ion exchange is conducted through an ion exchange-control film which has been provided on a glass substrate and in which a predetermined waveguide pattern has been formed. The waveguide pattern can be formed by the combination of either photolithography employing a mask or photolithography employing electron beam direct drawing and etching. Further, the pattern can also be formed by laser beam or electron beam direct drawing on a photo-resist or electron beam-resist layer coated on the ion exchange-control film, and then developed and fixed, followed by etching.

The ion exchange-control film has a function in that it prevents the diffusion of the ion from the molten salt to the substrate. Examples of the ion exchange-control film include a Ti film, an anodized Al film, an $SiO_2$ film, etc. The method for providing the ion exchange-control film is not limited, but sputtering is preferably employed. A Ti film provided by sputtering is most preferred. The thickness of the ion exchange-control film is preferably from 0.2 to 1.0 μm.

The glass substrate preferably has a composition suitable for ion exchange, and should contain a certain amount (preferably from 2 to 15 mol%) of a monovalent ion such as Na ion, K ion, etc.

The molten salt should contain a certain amount of a first monovalent ion doped therein such as, a monovalent ion that serves to increase the refractive index of the glass substrate (e.g., Tl ion, Ag ion, etc.) or a monovalent ion that serves to reduce the refractive index thereof (e.g., Na ion, K ion, etc.). The molten salt may be any of nitric acid salts and sulfuric acid salts. This salt is required to be in a molten state at the ion exchange temperature, and a composition suitable therefor is employed, which can be determined by one skilled in the art.

It is preferred that the molten salt be stirred throughout the ion exchange in order to obtain the uniformity in composition of the molten salt. It is also preferred that the temperature of the molten salt be uniform throughout to attaining improved uniformity and reproducibility.

The ion exchange-controlling film is then removed by etching. The method for etching is not limited and can be carried out by dipping the substrate in an etching solution composed of an aqueous ammonia and an aqueous hydrogen peroxide at 20° C. for a few minutes.

In the electric field-applying annealing step, the resulting glass substrate is annealed while electric field is continuously applied to the glass substrate at substantially right angles to the substrate at a temperature near the ion exchange temperature in the first ion exchange step, with the substrate plate being not immersed in a molten salt. The electric field is applied in such a direction that the side of the substrate on which a waveguide is to be formed is used as a positive potential side and the opposite side of the substrate as a negative potential side.

By this annealing step, the first monovalent ion that has been diffused in a substantially isotropic manner in the first ion exchange step is further forced toward the direction of the depth of the glass substrate plate.

This step can be easily practiced by placing the glass substrate on a metallic electrode plate connected to the negative potential in such a manner that the waveguide side of the substrate plate is faced upward, superposing on the glass substrate a metallic electrode plate connected to the positive potential, and then applying an electric field. Alternatively, the same effect can be obtained by applying an electric field while the glass substrate is placed between parallel electrode plates facing each other. It is also possible to use as an electrode a metallic thin film provided on the glass substrate, in place of electrode plates independent of the substrate. For the purpose of producing a special effect (e.g., producing a waveguide having a non-circular cross-section), the configuration in that the electrode plates and the substrate are not parallel to each other, i.e., the electric field is applied at non-right angles, may be employed.

In the second ion exchange step, thermal ion exchange is performed over the whole glass substrate at a temperature near the temperature for the first ion exchange step. The molten salt used in this step is required to contain a certain amount of a second monovalent ion which is different from the first monovalent ion doped in the first ion exchange step and which serves to change the refractive index of the glass substrate contrary to the first monovalent ion. Examples of this second monovalent ion which should be contained in the molten salt for use in this third step include K ion, Na ion, Li ion, etc. for decreasing the refractive index, and Tl ion, Ag ion, etc. for increasing the refractive index.

The first and second ion exchange steps and the annealing step are preferably carried out under the following conditions.

The first and second ion exchange steps are generally carried out at a temperature near the glass transition temperature $t_g$ of the glass substrate, preferably in the range of from $(t_g-80)$ to $(t_g+10)°$ C., and more preferably from $(t_g-60)$ to $(t_g-10)°$ C.

The first ion exchange step is preferably carried out for a time period $t_1$ which is determined by $D_1 \cdot t_1$ of from 3 to 24 ($\mu m^2$) where $D_1$ is the apparent diffusion constant of the first monovalent ion. The second ion exchange step is preferably carried out for a time period $t_2$ which is determined by $D_2 \cdot t_2$ of from 1/20 of $D_1 \cdot t_1$ to $D_1 \cdot t_1$.

The annealing step is generally carried out at the same or lower temperature as in the first ion exchange step, and the difference in temperature between the first ion exchange step and the annealing step is preferably from 0° to 150° C., and more preferably from 20° to 50° C.

The time period for the annealing step is preferably 60 minutes or less. The potential of the electric field applied is preferably from 120 to 300 V/mm.

Examples of the combination of the first and second monovalent ions include Tl and K, Tl and Na, Tl and a mixture K and Na, Cs and K, and Ag and K.

The process of the present invention for producing a low-loss embedded waveguide is a novel process and clearly different from the conventional processes. JP-B-61-14488 (the term "JP-B" as used herein means an "examined Japanese patent publication") discloses a process for producing a light waveguide. This process is characterized in that a metallic thin film is allowed to penetrate a glass or other material from the surface thereof to an inner part thereof by applying an electric field with heating. However, this process differs from the process of the present invention in the following ways. First, the substance that is diffused into a glass substrate in the first-step ion exchange according to the present invention is not a metallic film, but the first monovalent ion. Second, the ion diffused is then forced down by annealing with application of an electric field in the process of the reference, whereas in the present invention the part in the glass plate that has the highest (or the lowest) refractive index still remains around the surface of the glass plate. Third, in the present invention, the surface part having the highest (or the lowest) refractive index is removed for the first time by the second ion exchange step and, as a result, a part having a high (or low) refractive index is formed inside the glass substrate plate.

JP-A-256101 discloses a process for forming an optical element in a glass material, in which ion distribution is changed by applying an electric field while the glass material is kept being heated. However, a waveguide such as that produced by the present invention cannot be obtained by this process alone. Further, the process of this reference is no more than a technique of transferring an ion originally contained inside the glass material, and is different from the process of the present invention characterized by the combination of the three different steps.

According to the process of the present invention, a waveguide which has good single-mode fiber-coupling properties almost equal to those of single-mode fibers and which also shows a low loss can be easily produced without employing the electric field-applying ion exchange method which necessitates a troublesome production process.

DESCRIPTION OF PREFERRED EMBODIMENT

FIG. 1 (a) to (d) are cross-sectional views illustrating respective steps in one embodiment of the process for producing a low-loss embedded waveguide according to the present invention. In FIG. 1, (a) illustrates the step of forming an ion exchange-control film on a substrate, (b) illustrates the step of first ion exchange, (c) illustrates the step of electric field-applying annealing, and (d) illustrates the step of second ion exchange. In FIG. 1, numeral 10 denotes a substrate composed of borosilicate glass containing Na ions and K ions (total content of $Na_2O$ and $K_2O$; 13%. The substrate 10 is a transparent glass of optical grade containing only extremely small amounts of impurities such as Fe ion.

Numeral 11 denotes an ion exchange-control film composed of Ti formed by the sputtering process (thickness: 0.5 μm), and the ion exchange-control film has an opening 12 which has been formed by transferring a predetermined waveguide pattern on a mask (not shown) by photolithography and etching. Numeral 1 denotes a heat-resistant vessel for containing a molten salt 2 or 6. The molten salt 2 is a first molten salt containing a small amount of Tl ions which increase the refractive index of the substrate 10, and further containing K ions etc. (content of $TlNO_3$: 10 wt%). Numeral 3 denotes a stirrer which stirs the molten salt 2 in order to maintain the ion concentration distribution in the molten salt 2 uniform during ion exchange. Numeral 4 denotes an electric furnace. Numerals 13 and 14 respectively denote a first and second metallic electrode plate arranged in such a manner that the substrate 10, from which the ion exchange-control film 11 has been removed, is sandwiched between the electrode plates. Numerals 15 and 16 denote lead wires connected to electrode plates 13 and 14, respectively. The other end of each of the lead wires 15 and 16 is connected to a direct current power source 5, which applies a positive potential to the first electrode plate 13 and a negative potential to the second electrode plate 14. Numeral 6 denotes a second molten salt containing K ions (content of $KNO_3$: 100 wt%) which reduce the increased refractive index of the substrate plate 1.

In this preferred embodiment, each step was carried out under the following conditions. The first ion exchange was effected at a temperature (510° C.) near the glass transition temperature of the glass substrate 1 for a time period $t_1$ which had been determined from the equation $D_1 \cdot t_1 = 12$ (μm$^2$) where $D_1$ is the apparent diffusion constant of the first monovalent ion.

The substrate is dipped in an etching solution composed of an aqueous ammonia and an aqueous hydrogen at 20° C. for a few minutes so that the ion exchange-control film is removed by etching.

The electric field-applying annealing was then performed for 20 minutes at a temperature 30° C. lower than the temperature for the first ion exchange, while an electric field was kept being applied at a potential of 600 V for the 3 mm thickness of the substrate 1, i.e., at 200 V/mm.

The second ion exchange was carried out at the same temperature as that for the first ion exchange. The time period $t_2$ for the second ion exchange was determined from the equation $D_2 \cdot t_2 = 5.5$ (μm$^2$) where $D_2$ is the apparent diffusion constant of the first monovalent ion.

The temperature for the first and second ion exchange is preferably selected from the range of from 10° C. higher than the glass transition temperature to 80° C. lower than the glass transition temperature. Temperatures higher than the upper limit result in a large deformation of the glass substrate during the ion exchange, while temperatures lower than the lower limit cause the ion exchange to proceed too slowly and to take much time. The ion exchange periods $t_1$ and $t_2$ are preferably selected so that they satisfy the equation $D_1 \cdot t_1 > D_2 \cdot t_2$. If this equation is not satisfied, the refractive index difference $\Delta_n$ in the refractive index distribution range formed in the glass substrate tends to be too small to sustain sufficient guiding of modes.

The temperature for the electric field-applying annealing preferably is equal to or lower than the ion exchange temperature. In general, the temperature, the intensity of applied electric field, and the time period for this electric field-applying annealing should be determined so that the migration of the monovalent ion in the direction of application of the electric field becomes predominant in comparison to the thermal diffusion of the monovalent ion at that temperature.

Figure 2A:
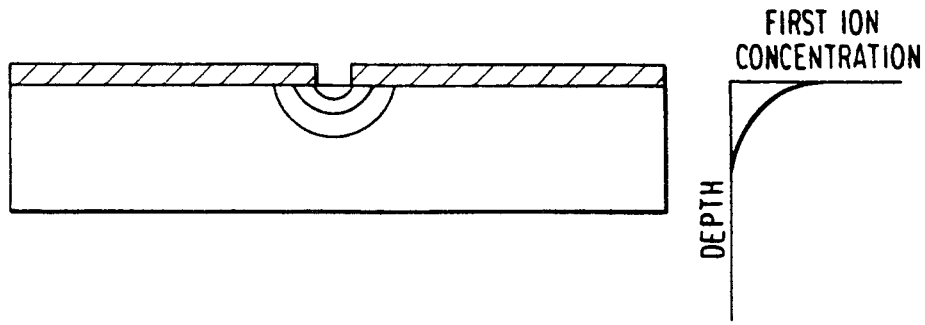
FIG. 2 (*a*), (*b*), and (*c*) are diagrammatic views illustrating the distribution of the first monovalent ion concentration in a vertical cross section of the waveguide after the steps (b), (c), and (d) in FIG. 1, respectively.
Figure 2B:
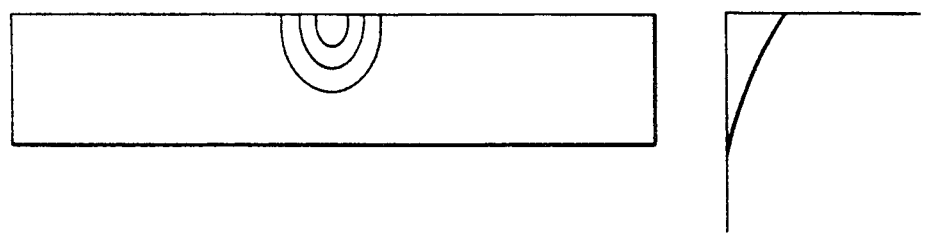
Figure 2C:
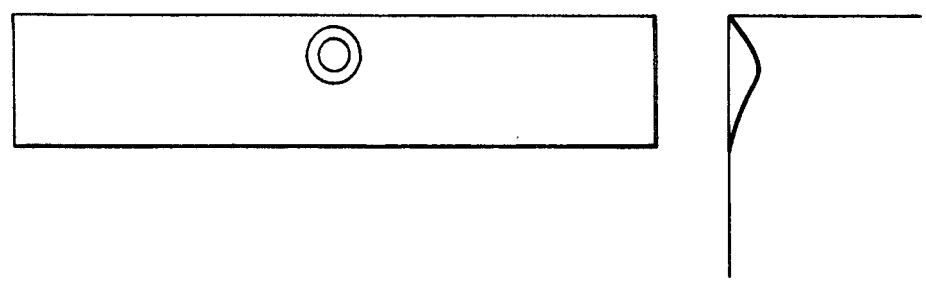

FIG. 2 (a) to (c) each is a schematic illustration showing isoconcentration contours of the first monovalent ion on a vertical cross section of the waveguide formed in the substrate in the process of the present invention as shown in FIG. 1. FIG. 2 (a) illustrates the state after the first ion exchange step, (b) illustrates the state after the electric field-applying annealing step, and (c) illustrates the state after the second ion exchange step.

In the above embodiment of the process of the present invention, an ion concentration distribution in an almost semicircular form is formed by the first ion exchange step. The refractive index distribution of the glass plate almost agrees with this ion concentration distribution. This distribution had a flatness ratio (the ratio of the horizontal diameter of the semicircle formed by the isoconcentration contour connecting the points whose ion concentration was 10% of the maximum concentration to the depth of the semicircle) was about 2.3. The ion concentration distribution, in this stage, along the center line passing through the center of the opening of the ion exchange-control film is shown in the graph at the right of FIG. 2 (a). The distribution can be approximated by a compensation error function.

The above ion concentration distribution is forced down by the electric field-applying annealing step in the direction of the depth of the substrate, as shown in FIG. 2 (b). This distribution had a flatness ratio (the ratio of the horizontal diameter of the semicircle formed by the isoconcentration contour connecting the points whose ion concentration was 10% of the maximum concentration to the depth of the semicircle) of about 1.2. The ion concentration distribution, in this stage, along the center line passing through the part corresponding to the center of the opening of the removed ion exchange-control film was as shown in the graph at the right of FIG. 2 (b). The distribution can be approximated by a compensation error function which had been extended in the direction of the depth of the substrate.

By the second ion exchange step, the above ion concentration distribution was formed into a substantially circular shape as shown in FIG. 2 (c), and the center of the circle was located about 8 μm below the substrate surface. This distribution had a flatness ratio (the ratio of the horizontal diameter of the circle formed by the isoconcentration contour connecting the points whose ion concentration was 10% of the maximum concentration to the vertical diameter thereof) of about 1.0. The ion concentration distribution, in this stage, along the center line passing through the part corresponding to the center of the opening of the removed ion exchange-control film was as shown in the graph at the right of FIG. 2 (c), and was a distribution substantially symmetrical relative to the horizontal line passing through that point in the circle which had the maximum concentration value.

The waveguide produced by the above embodiment of the present invention was a single-mode waveguide, and showed a coupling loss as measured when directly coupled to a standard single-mode fiber of 0.15 dB. This value is extremely low, specifically about 0.2 dB lower than the coupling loss value attainable by the conventional two-stage thermal ion exchange process. The transmission loss of the above-obtained waveguide was as low as about 0.1 dB/cm at wavelengths of 1.3 μm and 1.55 μm. It is considered that such low-loss properties are due to the fact that the waveguide has been embedded in the substrate 10 and, hence, suffers no loss caused by surface scattering.

The present invention has been described above with reference to one embodiment thereof, but other various conditions may, of course, be employed in the process of the present invention. For example, although electric field was applied in air in the above embodiment, it is possible to apply electric field in an insulation medium other than air, such as, for example, in vacuum.

Further, although Tl ion that increases refractive index was used in the first ion exchange step and K ion that reduces refractive index was used in the second ion exchange step in the above embodiment, the two ions may be replaced with each other. In this case, however, the open part pattern in the mask should, of course, be changed, e.g., the open part and the masked part should be replaced with each other.

It is also possible to conduct the electric field-applying annealing step and the second ion exchange step sequentially in the same furnace.

According to the process of the present invention, a single-mode waveguide which shows a coupling loss, as measured when coupled to a single-mode fiber, as low as the 0.1-dB order and also has a low transmission loss can be produced relatively easily. This process can provide such low-loss embedded waveguides in large quantities without the necessity of use of special production apparatuses or parts, so that reduced production cost can be attained. A comparison between the actual cost of the waveguide produced by the process for producing a low-loss embedded waveguide according to the present invention and that for the conventional two-stage electric field-applying ion exchange process revealed that the former was 1.25 against 3.50 for the latter, with the cost of the waveguide produced by the conventional two-stage thermal ion exchange process being taken as 1.00.

As described above, the process of the present invention can provide an embedded waveguide having excellent low-loss properties and, at the same time, attain a significant reduction in production cost.

While the invention has been described in detail and with reference to specific embodiments thereof, it will be apparent to one skilled in the art that various changes and modifications can be made therein without departing from the spirit and scope thereof.

What is claimed is:

1. A process for producing a low loss embedded waveguide, which comprises the following steps;
    a first ion exchange step in which a glass substrate containing a monovalent ion and capable of undergoing ion exchange is subjected to thermal ion exchange through an ion exchange-control film provided on an upper surface of said substrate and having a predetermined waveguide pattern formed therein, by immersing said substrate in a first molten salt containing a first monovalent ion capable of producing one of an increase and a decrease in the refractive index of said substrate;
    an etching step in which said ion exchange-control film is removed from said substrate by etching;
    while out of contact with said molten salt electric field applying annealing step in which a single electric field is applied to said substrate at substantially right angles to the the upper surface of the substrate at a temperature near the temperature at which the first ion exchange step was conducted, provided that the upper surface of said substrate is used as a positive potential side; and
    a second ion exchange step in which the substrate is subjected to thermal ion exchange by immersing said substrate in a second molten salt containing a second monovalent ion capable of producing an opposing change in the refractive index of said substrate to that produced by said first monovalent ion.

2. A process for producing a low-loss embedded optical waveguide as claimed in claim 1, wherein said ion exchange control film is a Ti film applied by sputtering.

3. A process for producing a low-loss embedded optical waveguide as claimed in claim 1, wherein the thickness of said ion exchange control film is from 0.2 to 1.0 μm.

4. A process for producing a low-loss embedded optical waveguide as claimed in claim 1, wherein said glass substrate contains from 2 to 15 mol % of a monovalent ion.

5. A process for producing a low-loss embedded optical waveguide as claimed in claim 1, wherein said first and second ion exchange steps are carried out at a temperature from 80° C. below the glass transition temperature of said substrate ($t_g - 80$) to 10° C. above the glass transition temperature of said substrate ($t_g 30 10$).

6. A process for producing a low-loss embedded optical waveguide as claimed in claim 1, wherein said first and second ion exchange steps are carried out at a temperature from 60° C. below the glass transition temperature of said substrate ($t_g - 60$) to 10° C. below the glass transition temperature of said substrate ($t_g - 10$).

7. A process for producing a low-loss embedded optical waveguide as claimed in claim 1, wherein said first ion exchange step is carried out for a time period $t_1$, said time period $t_1$ being determined by the relationship $$D_1 \cdot t_1 = (3 \mu m^2) \text{ to } (24 \mu m^2)$$

wherein $D_1$ is the apparent diffusion constant of the first monovalent ion.

8. A process for producing a low-loss embedded optical waveguide as claimed in claim 7, wherein said second ion exchange step is carried out for a time period $t_2$, siad time period $t_2$ being determined by the relationship $$D_2 \cdot t_2 = (1/20 \, D_1 \cdot t_1) \text{ to } (D_1 \cdot t_1)$$

wherein $D_2$ is the diffusion constant of the second monovalent ion.

9. A process for producing a low-loss embedded optical waveguide as claimed in claim 1, wherein the difference in temperature between the first ion exchange step and the annealing step is from 0° to 150° C.

10. A process for producing a low-loss embedded optical waveguide as claimed in claim 1, wherein the difference in temperature between the first ion exchange step and the annealing step is from 20° to 50° C.

11. A process for producing a low-loss embedded optical waveguide as claimed in claim 1, wherein the annealing step is conducted for less than 60 minutes.

12. A process for producing a low-loss embedded optical waveguide as claimed in claim 1, wherein the potential of the applied electric field is from 120 to 300 V/mm.

13. A process for producing a low loss embedded waveguide, comprising the following steps:
   (a) providing a glass substrate containing a monovalent ion, said substrate having an upper surface and a lower surface;
   (b) applying an ion exchange-control film to the upper surface of said substrate, said ion exchange control film having a predetermined waveguide pattern formed therein;
   (b) immersing said substrate in a first molten salt containing a first monovalent ion capable of producing one of an increase and a decrease in the refractive index of said substrate;
   (c) removing said ion exchange-control film from the upper surface of said substrate by etching;
   (d) applying a single electric field to said substrate at substantially right angles to the upper surface of said substrate while out of contact with said molten salt, said upper surface of said substrate being at a positive potential;
   (e) immersing said substrate in a second molten salt said second molten salt containing a second monovalent ion capable of producing an opposing change in the refractive index of said substrate to that produced by said first monovalent ion.

* * * * *